US009720455B2

(12) United States Patent
Jang

(10) Patent No.: US 9,720,455 B2
(45) Date of Patent: Aug. 1, 2017

(54) DISPLAY DEVICE

(71) Applicant: Samsung Display Co., Ltd., Yongin-si, Gyeonggi-do (KR)

(72) Inventor: Cheol Jang, Uiwang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/085,627

(22) Filed: Mar. 30, 2016

(65) Prior Publication Data

US 2016/0299539 A1    Oct. 13, 2016

(30) Foreign Application Priority Data

Apr. 8, 2015  (KR) .................. 10-2015-0049808

(51) Int. Cl.
*G06F 1/16* (2006.01)
*H04M 1/02* (2006.01)

(52) U.S. Cl.
CPC .......... *G06F 1/1681* (2013.01); *G06F 1/1652* (2013.01); *G06F 1/1677* (2013.01); *H04M 1/0241* (2013.01); *H04M 1/0245* (2013.01)

(58) Field of Classification Search
CPC . G06F 1/1677; G06F 1/1681; G09G 2380/02; H04M 1/0241; H04M 1/0243; H04M 1/0245
See application file for complete search history.

(56) References Cited

U.S. PATENT DOCUMENTS

| 5,719,799 | A  | * | 2/1998  | Isashi   | G06F 1/1618 345/169 |
|-----------|----|---|---------|----------|---------------------|
| 6,496,369 | B2 | * | 12/2002 | Nakamura | G06F 1/1616 165/80.3 |
| 6,510,636 | B1 | * | 1/2003  | Abramson | G09F 3/20 40/642.02 |
| 7,871,319 | B2 | * | 1/2011  | Tracy    | G06F 1/203 454/184 |
| 8,654,095 | B1 | * | 2/2014  | Cho      | G06F 3/0412 345/173 |
| 9,213,374 | B2 | * | 12/2015 | Hung     | G06F 1/1681 |
| 9,348,369 | B2 | * | 5/2016  | Kee      | G06F 1/1616 |
| 9,395,070 | B2 | * | 7/2016  | Endo     | H01L 27/323 |

(Continued)

FOREIGN PATENT DOCUMENTS

| KR | 10-2012-0002084 A | 1/2012 |
| KR | 10-2012-0081502 A | 7/2012 |
| KR | 10-2014-0034578 A | 3/2014 |

*Primary Examiner* — Adrian S Wilson
*Assistant Examiner* — Abhishek Rathod
(74) *Attorney, Agent, or Firm* — Lewis Roca Rothgerber Christie LLP

(57) ABSTRACT

A display device including: a first body member; a second body member; a hinge coupling the first body member and the second body member; a flexible display panel that is foldable, that is fixed to the first body member and to the second body member, and that is configured to display an image; and a controller configured to: measure a temperature of the flexible display panel; and control the hinge, when the measured temperature is lower than a reference temperature, to: maintain a state in which the first body member and the second body member are folded; or maintain a state in which the first body member and the second body member are unfolded.

18 Claims, 17 Drawing Sheets

(56) References Cited

U.S. PATENT DOCUMENTS

| | | | | |
|---|---|---|---|---|
| 2008/0140868 A1* | 6/2008 | Kalayjian | ............ | G06F 1/1698 710/8 |
| 2008/0232043 A1* | 9/2008 | Wang | ................... | G06F 1/1618 361/679.3 |
| 2010/0067181 A1* | 3/2010 | Bair | ..................... | G06F 1/1616 361/679.3 |
| 2010/0120470 A1* | 5/2010 | Kim | ..................... | G06F 1/1615 455/566 |
| 2011/0279352 A1* | 11/2011 | Adema | .................... | G09F 9/30 345/1.3 |
| 2013/0109438 A1* | 5/2013 | Kwack | ................ | H04M 1/0214 455/566 |
| 2013/0114193 A1* | 5/2013 | Joo | ........................ | F16M 11/08 361/679.01 |
| 2013/0205142 A1* | 8/2013 | Jung | ..................... | G06F 1/1677 713/300 |
| 2014/0042293 A1 | 2/2014 | Mok et al. | | |
| 2014/0198036 A1* | 7/2014 | Kim | ..................... | G06F 1/1652 345/156 |
| 2014/0320396 A1* | 10/2014 | Modarres | .............. | G06F 3/0412 345/156 |
| 2014/0380186 A1* | 12/2014 | Kim | ..................... | G09G 3/2092 715/746 |
| 2015/0382447 A1* | 12/2015 | Hsiao | ................... | H05K 1/0212 361/749 |
| 2016/0062412 A1* | 3/2016 | Park | ..................... | G06F 1/1616 361/679.27 |

* cited by examiner

DISPLAY DEVICE

CROSS-REFERENCE TO RELATED APPLICATION

This application claims priority to, and the benefit of, Korean Patent Application No. 10-2015-0049808 filed in the Korean Intellectual Property Office on Apr. 8, 2015, the entire contents of which are incorporated herein by reference.

BACKGROUND OF THE INVENTION

1. Field

The present disclosure relates to a display device, and more particularly, to a display device that is foldable and unfoldable.

2. Description of the Related Art

Recently, portable electronic devices, such as smartphones, media players, and tablet computers, have increased in popularity. These types of portable devices typically include an integrated display device, and many of these devices include a dual display. For example, a mobile device may have two display devices coupled to each other by a hinge to form one large display, wherein the display devices may be unfolded to be parallel to each other.

Users typically desire a device as small as possible (e.g., to conveniently carry the device in their pocket), but desire a device having a larger display screen for visual satisfaction.

Thus, manufacturers of displays have developed a flexible display that is able to be used to provide a display screen that is larger than the display screen that is typically integrated in a smaller, portable electronic device.

For example, in a case of a device on which a flexible display is mounted, when the user wishes to use the device, the user unfolds a folded portion of the device to use a large screen. In addition, when the user does not use the device, the user folds the device to be smaller.

When the user is moving or carrying the device described above, the device may be exposed to various environments, such as high temperature, low temperature, and the like. An element configuring the flexible display may be difficult to deform at a low temperature, but may be easily deformed only at a certain temperature or higher.

When the user suddenly folds or unfolds the device in a state in which the device is exposed to the low temperature, damage may occur due to an element being suddenly changed while a portion of the flexible display is folded or unfolded.

The above information disclosed in this Background section is only for enhancement of understanding of the background of the invention, and therefore it may contain information that does not form the prior art that is already known in this country to a person of ordinary skill in the art.

SUMMARY

Embodiments of the present invention provide a display device having features of preventing an element included in a flexible display panel from being suddenly changed.

A display device according to an embodiment of the present invention includes: a first body member; a second body member; a hinge coupling the first body member and the second body member; a flexible display panel that is foldable, that is fixed to the first body member and to the second body member, and that is configured to display an image; and a controller configured to: measure a temperature of the flexible display panel; and control the hinge, when the measured temperature is lower than a reference temperature, to: maintain a state in which the first body member and the second body member are folded; or maintain a state in which the first body member and the second body member are unfolded.

The display device may further include a first locking member at the first body member that is configured to protrude toward the hinge, and is configured to be received by the hinge; a second locking member at the second body member that is configured to protrude toward the hinge, and is configured to be received by the hinge; and a driving member configured to generate a driving force to cause the locking members to protrude, wherein the hinge defines one or more receiving grooves for receiving the locking members.

The one or more receiving grooves may include a pair of first receiving grooves configured to receive the locking members when the second body member is unfolded from the first body member.

The hinge may include a first hinge member between the first body member and the second body member, and a second hinge member having one side that is rotatably coupled to the first hinge member, and another side that is rotatably coupled to either the first body member or the second body member.

The locking members may be configured to protrude to be adjacent the first hinge member in the state in which the first body member and the second body member are folded.

The one or more receiving grooves may include: a pair of second receiving grooves configured to receive the locking members in the state in which the first body member and the second body member are unfolded; and a pair of third receiving grooves configured to receive the locking members in the state in which the first body member and the second body member are folded.

The second receiving grooves are perpendicular to respective ones of the third receiving grooves.

The second body member may include two second body members coupled to respective sides of the first body member.

The controller may include a temperature measuring unit at the first body member and at the second body member, and configured to measure a temperature of the flexible display panel.

The controller may further include a deformation sensor configured to sense whether the second body member is deformed with respect to the first body member, and the controller is configured to control the hinge to maintain a deformed state of the display device when a reference time lapses after the deformation sensor senses that deformation of the display device is completed.

The second body member and the first body member may be configured to be at a same plane when the second body member is maximally rotated away from the first body member.

The second body member may be configured to form an angle with the first body member when the second body member is maximally rotated away from the first body member.

A method for controlling deformation of a display device including a flexible display panel according to an embodiment of the present invention includes: sensing deformation of the display device; measuring a temperature of the flexible display panel; comparing the measured temperature with a reference temperature; initiating or maintaining a released state when the measured temperature is higher than the reference temperature; and initiating or maintaining a locked state when the measured temperature is not higher than the reference temperature.

The method may further include: determining whether the deformation of the display device is completed after the initiating or maintaining the released state.

The method may further include: initiating or maintaining the locked state when the deformation of the display device is completed; and initiating or maintaining the released state when the deformation of the display device is not completed.

The method may further include: initiating or maintaining the locked state once a reference time lapses after the deformation of the display device is completed.

The reference time may be about 2 seconds or less.

The display device may include: a first body member; and a second body member rotatably coupled to the first body member, wherein the locked state is a state in which the second body member is not rotatable with respect to the first body member, and wherein the released state is a state in which the second body member is rotatable with respect to the first body member. According to an embodiment of the present invention, in the display device, the controller may measure the temperature of the flexible display panel and may prevent the first body member and the second body member from being unfolded or folded when the measured temperature is lower than the reference temperature.

Therefore, it is possible to prevent or reduce the chance of the element included in the flexible display panel from being suddenly changed and damaged by rotation of the first body member and the second body member in a state of temperature at which the element may not flexible changed.

DETAILED DESCRIPTION

Figure 1:
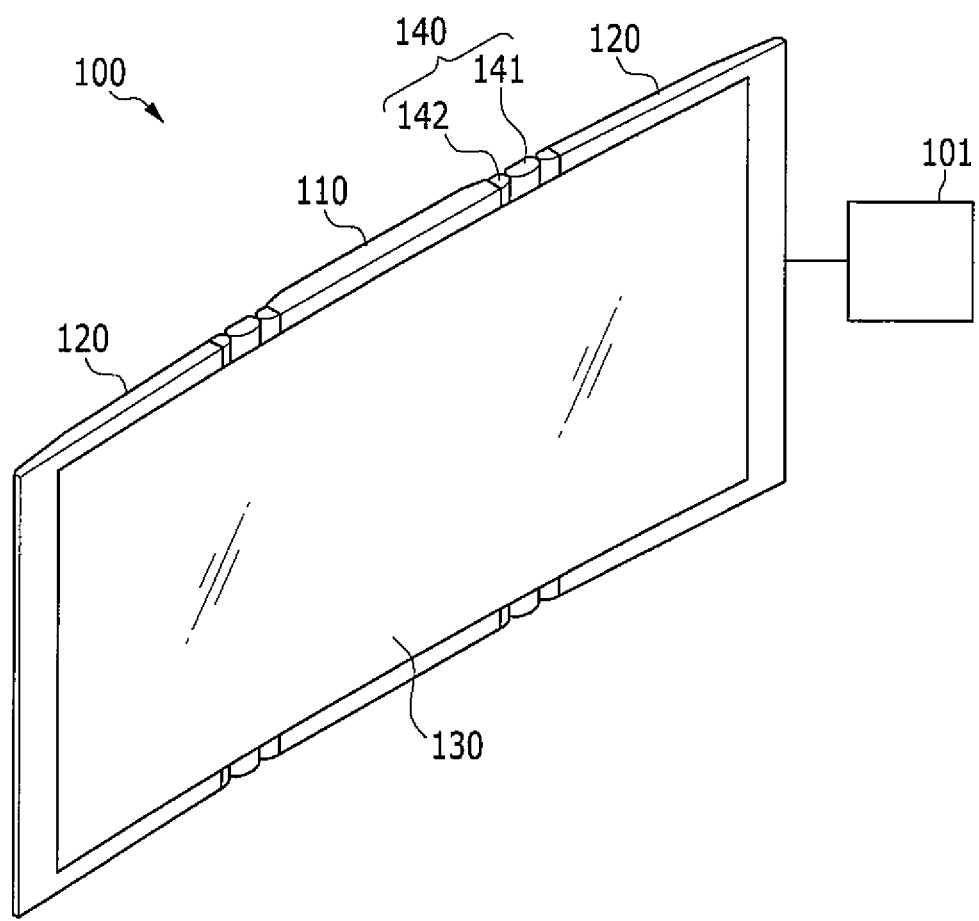
FIG. 1 is a perspective view showing a state in which a display device, according to an exemplary embodiment, is unfolded.

Hereinafter, exemplary embodiments will be described in detail with reference to the accompanying drawings so that those skilled in the art may easily practice the present invention. The present invention may be implemented in various suitable forms and is not limited to the exemplary embodiments described in the present specification.

Accordingly, the drawings and description are to be regarded as illustrative in nature and not restrictive. Like reference numerals designate like elements (or components) throughout the specification In several exemplary embodiments, components having the same or substantially the same configuration will be described representatively in a first exemplary embodiment by the same reference numerals. In exemplary embodiments other than the first exemplary embodiment, configurations different from those of the first exemplary embodiment will be described, while configurations that are the same as those of the first exemplary embodiment may be omitted.

It will be understood that when an element or layer is referred to as being "on," "connected to," "coupled to," "connected with," "coupled with," or "adjacent" another element or layer, it can be "directly on," "directly connected to," "directly coupled to," "directly connected with," "directly coupled with," or "directly adjacent" the other element or layer, or one or more intervening elements or layers may be present. Further "connection," "connected," etc. may also refer to "electrical connection," "electrically connect," etc. depending on the context in which they are used as those skilled in the art would appreciate. When an element or layer is referred to as being "directly on," "directly connected to," "directly coupled to," "directly connected with," "directly coupled with," or "immediately adjacent" another element or layer, there are no intervening elements or layers present.

It will be understood that, although the terms "first", "second", "third", etc., may be used herein to describe various elements, components, regions, layers, and/or sections, these elements, components, regions, layers and/or sections should not be limited by these terms. These terms are used to distinguish one element, component, region, layer or section from another element, component, region, layer or section. Thus, a first element, component, region, layer, or section discussed below could be termed a second element, component, region, layer, or section, without departing from the spirit and scope of the present invention.

Further, it will also be understood that when one element, component, region, layer and/or section is referred to as being "between" two elements, components, regions, layers, and/or sections, it can be the only element, component, region, layer and/or section between the two elements, components, regions, layers, and/or sections, or one or more intervening elements, components, regions, layers, and/or sections may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

As used herein, the term "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Figure 2:
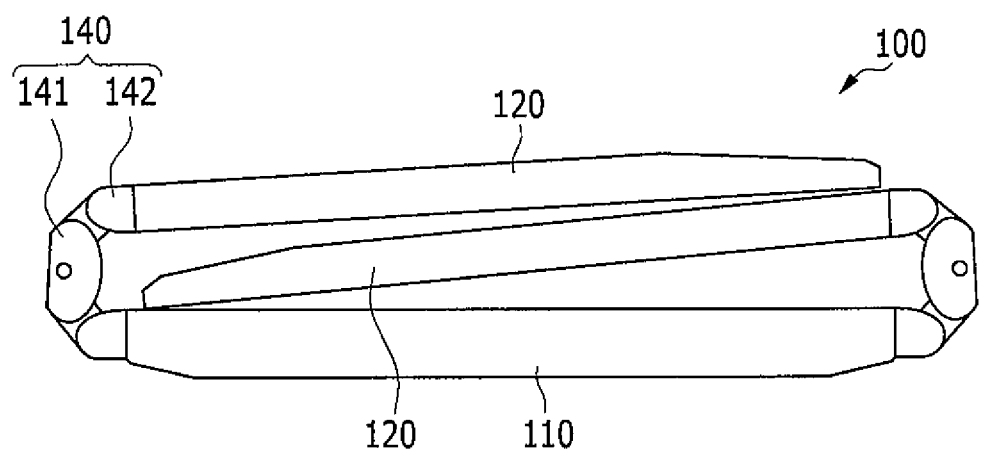
FIG. 2 is a drawing showing a side view in a state in which the display device, according to the exemplary embodiment shown in FIG. 1, is folded.

FIG. 1 is a perspective view showing a state in which a display device, according to an exemplary embodiment, is unfolded, and FIG. 2 is a drawing showing a side view in a state in which the display device, according to the exemplary embodiment shown in FIG. 1, is folded.

Referring to FIGS. 1 and 2, a display device 100 according to an exemplary embodiment includes a first body member 110, a second body member 120 (e.g., a pair of second body members 120), a hinge 140, and a controller 101.

The first body member 110 is configured to output an image. A shape of the first body member 110 may be a quadrangle, by way of example.

The first body member 110 may be larger than the second body member 120 to be described below, although the present invention is not limited thereto. For example, the first body member 110 and the second body member 120 may be formed to have the same or substantially the same size.

The second body member 120 is coupled to the first body member 110 by the hinge 140. A shape of the second body member 120 may be a quadrangle, by way of example.

The second body member 120 may have the same or substantially the same width as that of the first body member 110. In more detail, widths in directions that are substantially perpendicular to a direction in which the first body member 110 and the second body member 120 are folded may be equal or substantially equal to each other. Accordingly, when the display device 100 is folded so that one surface of the second body member 120 is adjacent one surface of the first body member 110, the second body member 120 might not protrude with respect to, or extend past, the first body member 110.

In the display device according to the present exemplary embodiment of the present invention, there may be two second body members 120. The second body members 120 may each be coupled to a respective side of the first body member 110. In this case, the first body member 110 may serve as a body of (e.g., a center of) the display device 100. A manipulation button for manipulating the display device 100 may be located at one side of the first body member 110, although the present invention is not limited thereto. For example, the manipulation button may be located at the second body member 120.

In a state in which the second body member 120 is maximally rotated in a direction away from the first body member 110, the second body member 120 and the first body member 110 may be positioned at the same or substantially the same plane as each other. Accordingly, a shape in which the display device 100 according to an exemplary embodiment is maximally unfolded may be a plane (e.g., a flat screen).

Alternately, in a state in which the second body member 120 is maximally rotated in a direction away from the first body member 110, the second body member 120 may form an angle (e.g., a predetermined angle) with the first body member 110. Accordingly, a shape in which the display device 100 according to an exemplary embodiment is maximally unfolded may be a curved surface.

As such, a flexible display panel 130 to be described below may be a plane or may be a curved surface, depending on deformation of the display device 100.

The flexible display panel 130 may be safely deformable (e.g., foldable, or capable of being folded and unfolded), and may be configured to display an image. The flexible display panel 130 is fixed to the first body member 110 and to the second body member 120. That is, when the first body member 110 and the second body member are folded or unfolded, the flexible display panel 130 may be folded or unfolded.

In more detail, when corresponding surfaces of the second body member 120 and the first body member 110 are folded to face each other, a portion of the flexible display panel 130 positioned at a boundary portion between the first body member 110 and the second body member 120 may be folded. Alternately, as the second body member 120 is unfolded from the first body member 110, the flexible display panel 130 may also be unfolded.

The hinge 140 connects the first body member 110 and the second body member 120 to each other. That is, one side of the hinge 140 is connected to one side of the first body member 110, and the other side of the hinge 140 is connected to one side of the second body member 120. In the present embodiment, another hinge is used to connect the other side of the first body member 110 to one side of the other second body member 120.

The hinge 140 maintains a state in which the second body member 120 is adjacent the first body member, or maintains a state in which the second body member 120 is unfolded from the first body member 110. A detailed structure of the hinge 140 for achieving these states will be described below.

The controller 101 controls a general operation of the display device 100. In more detail, the controller 101 measures a temperature of the flexible display panel 130, and maintains a state in which the first body member 110 and the second body member 120 are adjacent each other, or maintains a state in which the first body member 110 and the second body member 120 are unfolded, when the measured temperature is not higher than a reference temperature. That is, the controller 101 may be configured to prevent deformation (e.g., folding or unfolding) of the display device 100, or to allow the deformation of the display device 100.

The controller 101 may be connected to the hinge 140. In more detail, the controller 101 may be located in the first body member 110 or in the second body member 120. The controller 101 may be a microprocessor, by way of example.

The above-mentioned controller 101 may include a temperature measuring unit (e.g., a thermometer(s)). The temperature measuring unit is installed in the first body member 110 and the second body member 120 to measure the temperature of the flexible display panel 130. The temperature measuring unit may be a temperature sensor, by way of example. The temperature sensor may be positioned near the flexible display panel 130.

The controller 101 compares temperature data measured by the temperature measuring unit with a reference temperature. Here, the reference temperature may be temperature at which an element included in the flexible display panel 130, and configuring the flexible display panel 130, may be safely deformed. In addition, because the temperature at which the element may be safely deformed may be different depending on a specification and structure of the flexible display panel 130, the present invention is not limited to a specific temperature.

As described above, in the display device 100 according to an embodiment of the present invention, the controller 101 measures the temperature of the first body member 110 and the second body member 120, and is configured to prevent the first body member 110 and the second body member 120 from being unfolded or from being folded when the measured temperature is lower than the reference temperature.

Therefore, it is possible to prevent the element included in the flexible display panel 130 from being suddenly changed and damaged by rotation of the first body member 110 and the second body member 120 when at a temperature at which the element may not be flexibly changed.

Figure 3:
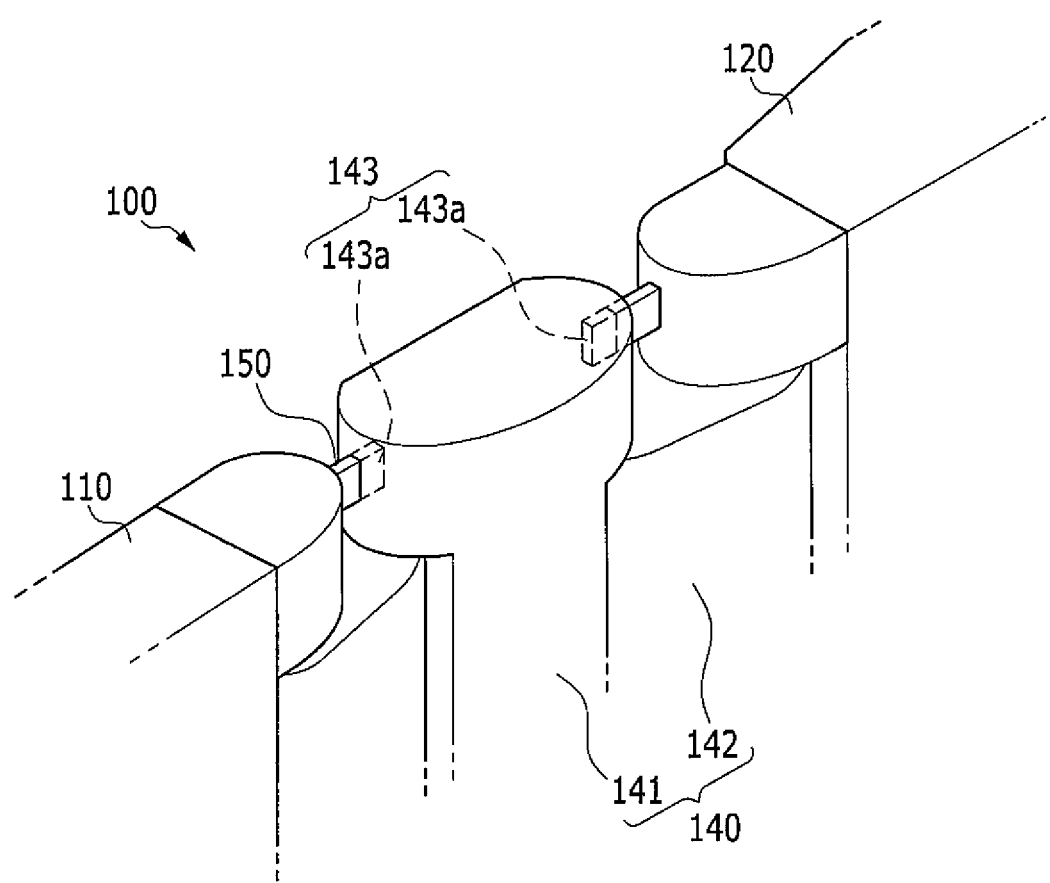
FIG. 3 is a drawing showing a state in which locking members protrude from a first body member and a second body member, and are received in receiving grooves of a hinge in the display device according to the exemplary embodiment shown in FIG. 1.
Figure 4:
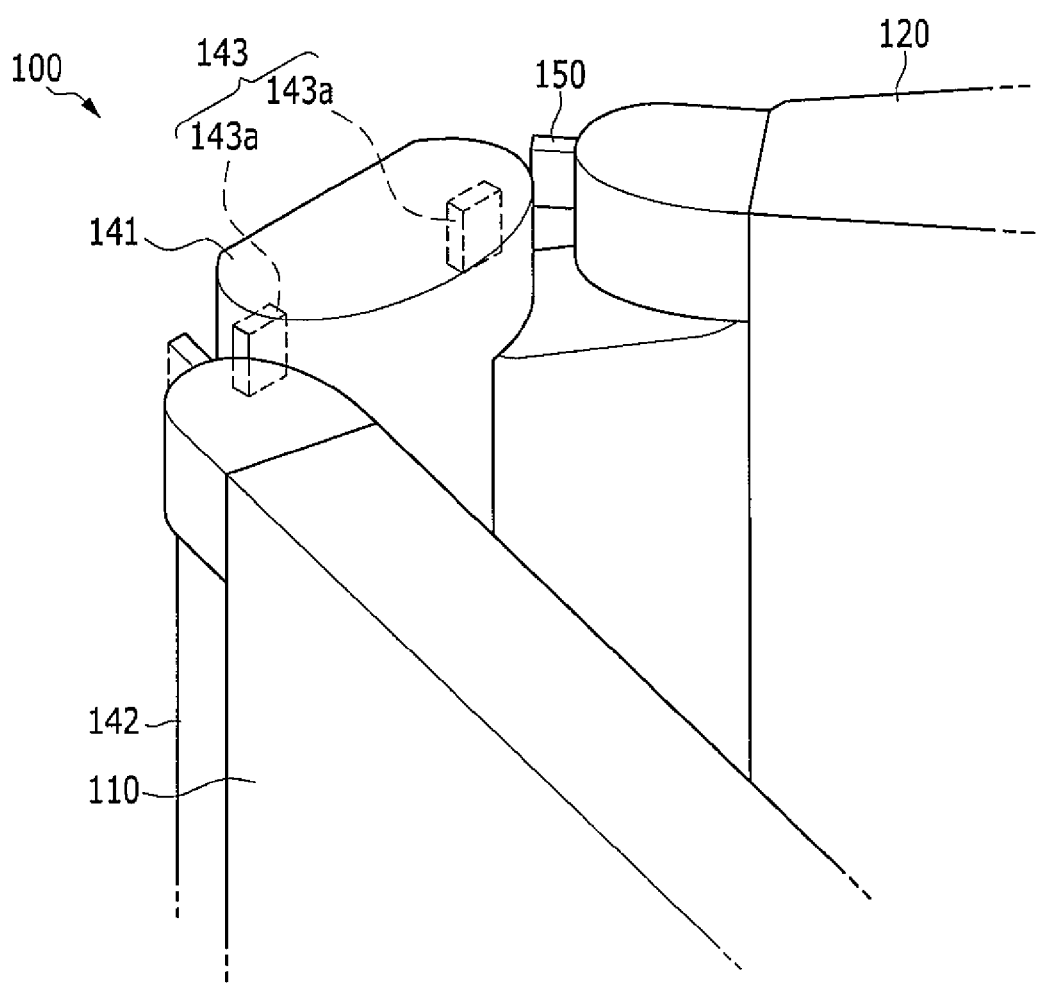
FIG. 4 is a drawing showing a case in which the locking members protrude from the first body member and the second body member in a state in which the display device, according to the exemplary embodiment shown in FIG. 1, is folded.

FIG. 3 is a drawing showing a state in which locking members protrude from a first body member and from a second body member, and are received in receiving grooves of a hinge in the display device, according to the exemplary embodiment shown in FIG. 1, and FIG. 4 is a drawing showing a case in which the locking members protrude from the first body member and from the second body member in a state in which the display device, according to the exemplary embodiment shown in FIG. 1, is folded.

Referring to FIGS. 3 and 4, the display device 100 according to the exemplary embodiment described above may include locking members 150 and a driving member.

The locking members 150 are installed at the first body member 110 and at the second body member 120, respectively, to protrude toward the hinge 140, and/or to be received by the hinge 140. For example, when the locking member 150 is installed at the first body member 110, the locking member 150 may protrude from one side of the first body member 110, or may be received at the first body member 110.

By way of example, the locking member 150 may have a stick shape. Further, the locking member 150 may have a rectangular column shape.

The driving member is configured to generate driving force to allow the locking member 150 to protrude or be received. The driving member may be a solenoid, a liner motor, a pneumatic cylinder, or a hydraulic cylinder, although the present invention is not limited thereto. For example, any driving member may be used as long as it is configured to allow the locking member 150 to protrude or be received.

When the display device 100 according to an exemplary embodiment includes the locking members 150 and the driving member, at least one receiving groove 143 may be formed in the hinge 140. The locking member 150 described above may be received in the receiving groove 143, which may be formed to have a shape corresponding to the locking member 150.

Once the locking member 150 protrudes from the first body member 110 and is received in the corresponding receiving groove 143, the first body member 110 may be fixedly coupled to the hinge 140. In addition, once the locking member 150 protrudes from the second body member 120 and is received in the corresponding receiving groove 143, the second body member 120 may be fixedly coupled to the hinge 140. Accordingly, the first body member 110 and the second body member 120 may be fixed so that they are not rotated with respect to the hinge 140.

In the display device 100 according to an exemplary embodiment of the present invention, a detailed structure of the hinge 140 may include a first hinge member 141 and a second hinge member 142, by way of example.

The first hinge member 141 is positioned between the first body member 110 and the second body member 120. The first hinge member 141 may have a length and/or width that may be respectively similar to a length and/or width of the first body member 110 or the second body member 120.

One side of the second hinge member 142 is rotatably coupled to the first hinge member 141, and the other side of the second hinge member 142 is rotatably coupled to either the first body member 110 or the second body member 120. For example, the second hinge member 142 may include two parts, one at each side of the first hinge member 141, and each being coupled to either the first body member 110 or the second body member 120.

To this end, spaces in which portions of the second hinge member 142 are housed may be formed in one side of each of the first hinge member 141, the first body member 110, and the second body member 120. The above-mentioned second hinge member 142 may have a stick shape, by way of example. The second hinge member 142 may be formed to have a shorter length than the first hinge member 141. Because a coupling structure between the second hinge member 142 and the first hinge member 141 may be a structure in which the second hinge member 142 and the first hinge member 141 may be rotated with respect to each other in a general mechanical apparatus, a detail description thereof will be omitted.

A driving motor and at least one gear may be located in the hinge 140. A user may push a manipulation button, which causes a driving force to be generated from the driving motor. The second body member 120 may be automatically rotated with respect to the first body member 110 by the driving force generated from the driving motor. Here, because the rotation of the driving motor and the gear with respect to each other, and the disposition of the driving motor and the gear, may be known, a detail description thereof will be omitted.

The above mentioned receiving groove 143 is formed of a pair of first receiving grooves 143a. In addition, the pair of first receiving grooves 143a may be formed at positions in which the locking members 150 may be respectively housed in a state in which the second body member 120 is unfolded from the first body member 110. In more detail, the first receiving grooves 143a may each be formed at respective sides of the first hinge member 141.

Once the locking member 150 protrudes in a state in which the second body member 120 is adjacent the first body member 110, the protruded locking member 150 may be positioned near the first hinge member 141. Accordingly, when the first body member 110 and the second body member 120 are again unfolded, the first hinge member 141 interferes with movement of the protruded locking members 150, thereby making it possible to prevent or substantially prevent the rotation of the second body member 120 with respect to the first body member 110.

Hereinafter, the interference with the rotation of the first body member 110 with respect to the second body member 120 that is caused by the locking members 150 in the display device 100, according to an exemplary embodiment of the invention having the structure described above, will be described below in detail with reference to the accompanying drawings.

The controller 101 included in the display device 100 according to an exemplary embodiment may further include a deformation sensor.

As described above, the driving motor may be located in the hinge 140 of the display device 100 according to an exemplary embodiment of the present invention. In such an embodiment, the user would not need to apply user-generated force to directly deform the display device 110. However, in an embodiment in which the driving motor is omitted, the user may deform the display device 100 by applying force to the first body member 110 and/or to the second body member 120. When the user ceases to apply force to the first body member 110 and the second body member 120 to cause the first body member 110 and the second body member 120 to rotate with respect to each other, the rotation of the first body member 110 and the second body member 120 stops.

The deformation sensor is configured to sense whether or not the second body member 120 is deformed with respect to the first body member 110. Once the deformation sensor senses that the deformation of the display device 100 is completed, the deformation sensor transmits a signal indicating deformation completion to the controller.

When a reference time lapses after the deformation sensor senses that the deformation of the display device 100 is completed, the controller controls the hinge 140 to allow the display device 100 to maintain a deformed state. In this process, the controller causes the locking members 150 to protrude from the first body member 110 and/or the second body member 120.

The deformation sensor for this purpose may be a rotation sensor installed in the hinge 140, by way of example. The rotation sensor senses the rotation of the first body member 110 and the second body member 120 (e.g., with respect to each other and/or with respect to the hinge 140). The rotation sensor may be a rotary sensor, by way of example. Because the rotary sensor is installed in a general rotation structure to be used to sense the rotation, a description of a structure of the rotary sensor will be omitted.

FIGS. 5A to 5D are drawings schematically showing locked or unlocked states according to a movement of the locking members 150 in a state in which the display device 100 according to an exemplary embodiment is unfolded or folded.

Figure 5A:
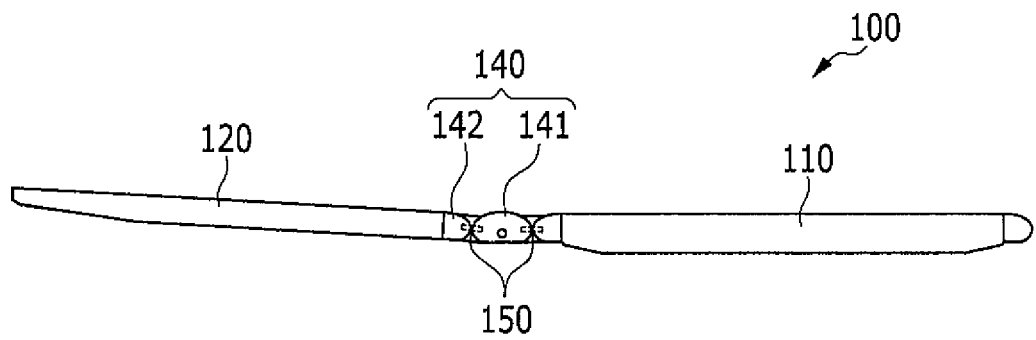
FIG. 5A is a diagram schematically showing a state of the display device shown in FIG. 3.

FIG. 5A is a diagram schematically showing a state of the display device shown in FIG. 3.

Once the locking members 150 protrude in the state in which the first body member 110 and the second body member 120 are unfolded, as shown in FIG. 5A, the first body member 110 and the second body member 120 are coupled to the hinge 140, and are not rotated with respect to each other.

Figure 5B:
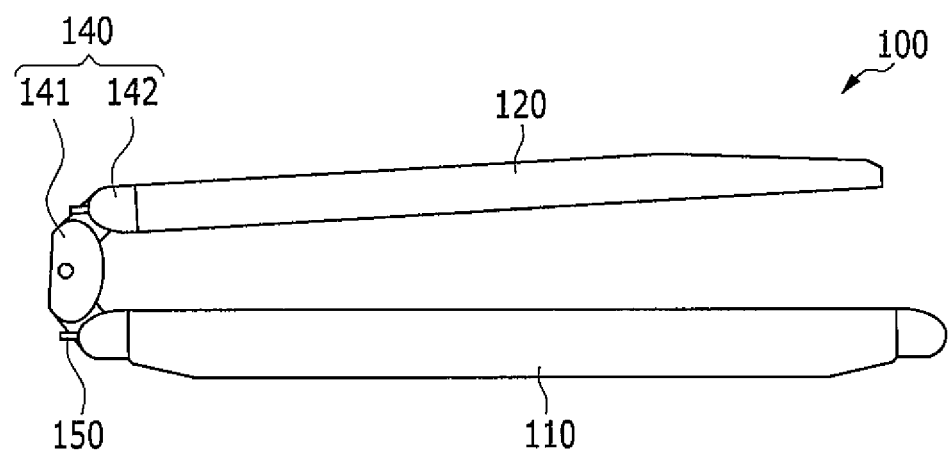
FIG. 5B is a diagram schematically showing a state of the display device shown in FIG. 4.

FIG. 5B is a diagram schematically showing a state of the display device shown in FIG. 4.

Once the locking members 150 protrude in the state in which the display device 100 is folded as shown in FIG. 5B, the hinge 140 interferes with movement of the locking members 150, thereby preventing the first body member 110 and the second body member 120 from being unfolded.

Figure 5C:
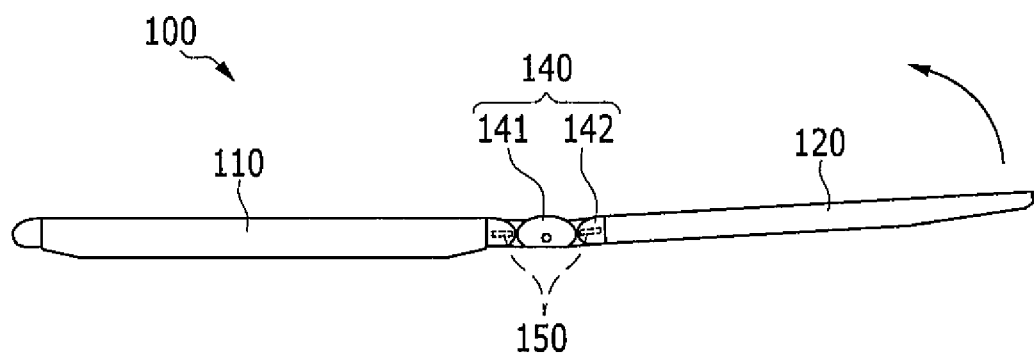
FIG. 5C is a diagram showing a state in which the locking members are received in the first body member and the second body member, respectively, in the state of FIG. 5A.
Figure 5D:
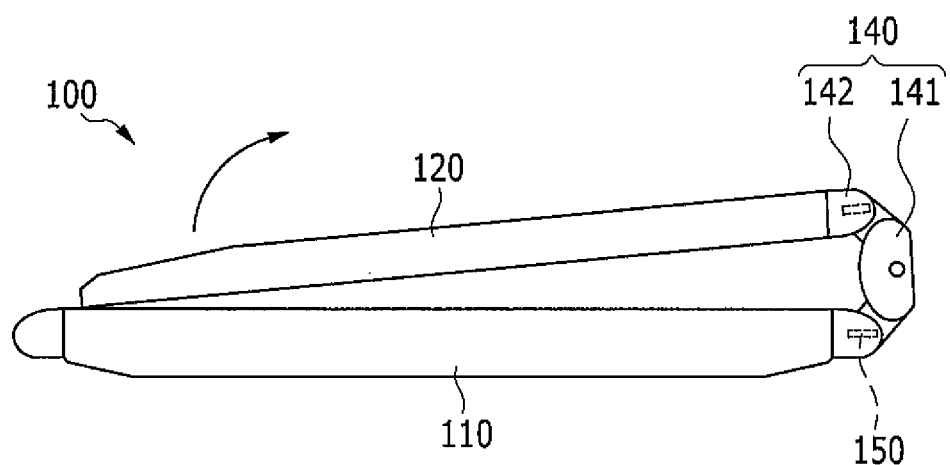
FIG. 5D is a diagram showing a state in which the locking members are received in the first body member and the second body member, respectively, in the state of FIG. 5B.

FIG. 5C is a diagram showing a state in which the locking members are received in the first body member and the second body member, respectively, in the state shown in FIG. 5A, and FIG. 5D is a diagram showing a state in which the locking members are received in the first body member and the second body member, respectively, in the state shown in FIG. 5B.

As shown in FIGS. 5C and 5D, because the locking members 150 are in a state in which they are received in the first body member 110 and the second body member 120, respectively (e.g., the locking members 150 do not protrude), the first body member 110 and the second body member 120 may be rotated with respect to each other.

The above-mentioned state is a state in which the controller measures the temperature of the first body member 110 and the second body member 120, and determines that the measured temperature is higher than a reference temperature, thereby unlocking the locking members 150. Accordingly, when the user applies force to the display device 100 to attempt to rotate the second body member 120 with respect to the first body member 110 to deform the display device 100, the user may fold or unfold the display device 100.

Figure 6:
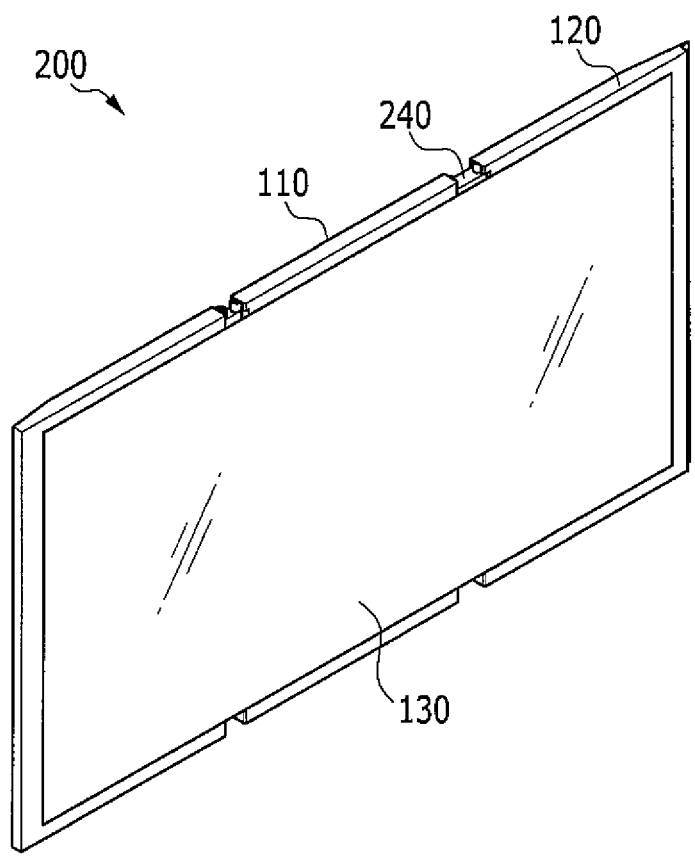
FIG. 6 is a perspective view showing a state in which a display device, according to another exemplary embodiment, is unfolded.
Figure 7:
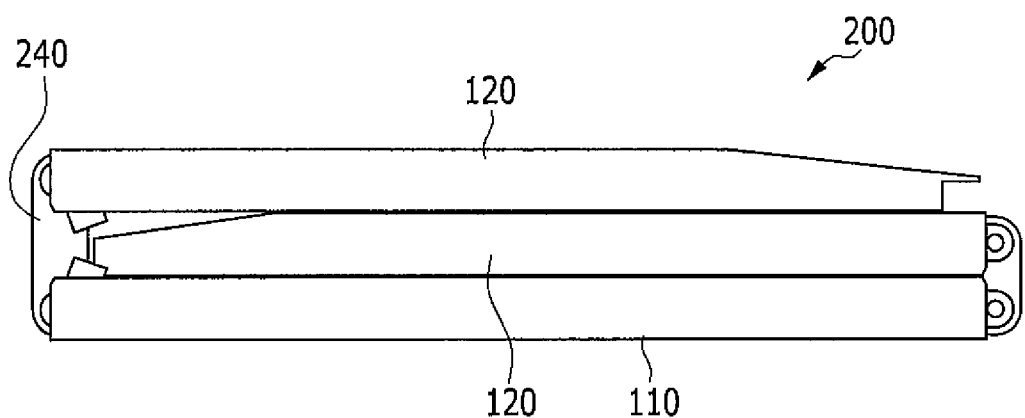
FIG. 7 is a drawing showing a side view of a state in which the display device, according to the exemplary embodiment shown in FIG. 6, is folded.

FIG. 6 is a perspective view showing a state in which a display device, according to another exemplary embodiment, is unfolded, and FIG. 7 is a drawing showing a side view of when the display device, according to another exemplary embodiment shown in FIG. 6, is folded.

Referring to FIGS. 6 and 7, the display device 200 according to another exemplary embodiment is different from the display device 100 according to the previously described exemplary embodiment in that a hinge 240 is a single member.

Figure 8:
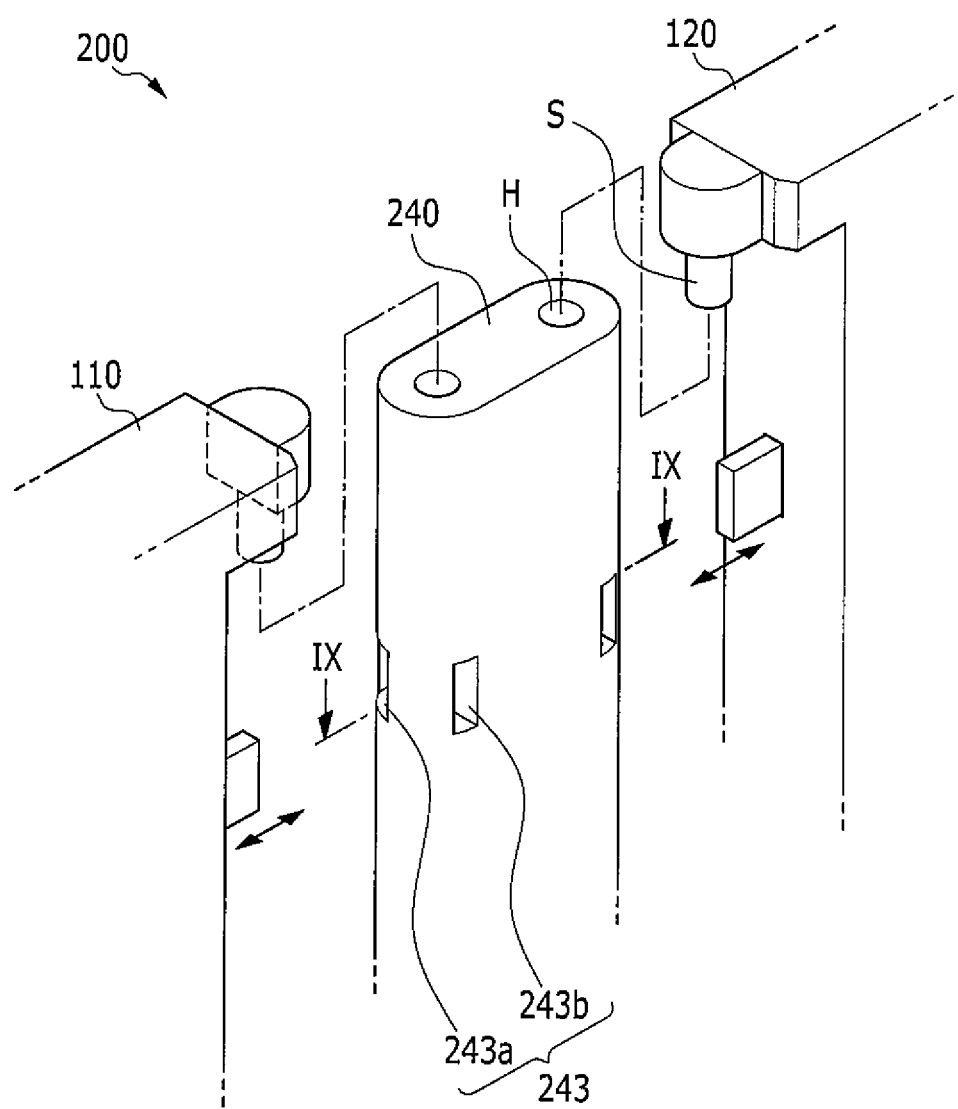
FIG. 8 is an exploded perspective view showing a hinge, a first body member, and a second body member in the display device according to the exemplary embodiment shown in FIG. 6.
Figure 9:
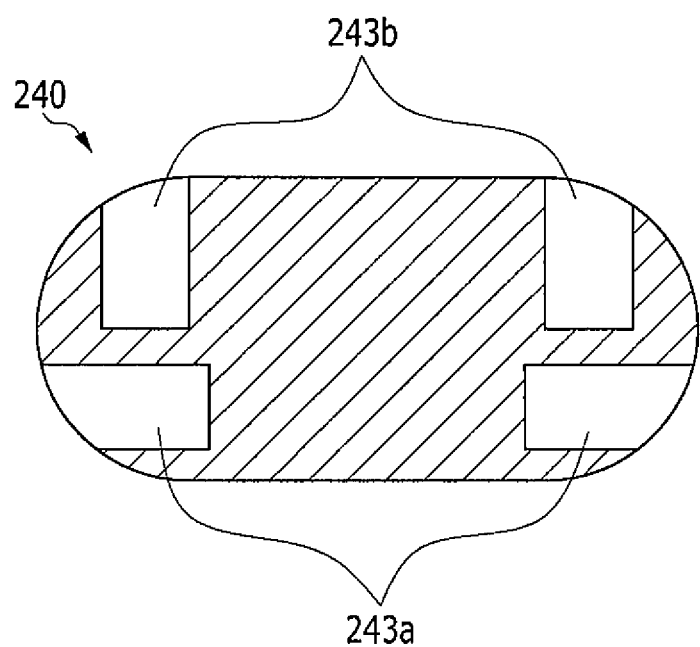
FIG. 9 is a cross-sectional view taken along the line IX-IX shown in FIG. 8.

FIG. 8 is an exploded perspective view showing a hinge, a first body member, and a second body member in the display device according to the exemplary embodiment shown in FIG. 6, and FIG. 9 is a cross-sectional view taken along the line IX-IX shown in FIG. 8.

A structure of the display device 200 according to the present exemplary embodiment will be described in more detail with reference to FIGS. 8 and 9. The receiving groove 243 includes a pair of second receiving grooves 243a and a pair of third receiving grooves 243b. In addition, the pair of second receiving grooves 243a may be at positions in which the locking members 150 may be respectively housed when the second body member 120 is unfolded from the first body member 110. The pair of third receiving grooves 243*b* may be at positions in which the locking members 150 may be respectively housed when a surface of the second body member 120 faces a surface of the first body member 110 (i.e., when the display device 200 is in a folded state).

The pair of second receiving grooves 243*a* and the pair of third receiving grooves 243*b* may be substantially perpendicular to each other. For example, the pair of second receiving grooves 243*a* may form an angle of 180° with each other, and each of the pair of third receiving grooves 243*b* may form an angle of about 90° with a respective one of the second receiving grooves 243*a* on the hinge 240.

The pair of second receiving grooves 243*a* may be respectively formed at left and right sides of the hinge 240, and the third receiving grooves 243*b* may be positioned at a front portion of the hinge 240 to be spaced from each other. The second receiving grooves 243*a* and the third receiving grooves 243*b* described above may have the same or substantially the same size as each other. In addition, the second receiving grooves 243*a* and the third receiving grooves 243*b* may have the same or substantially the same shape as each other (e.g., to accommodate the locking members 150).

Because the display device 200 according to another exemplary embodiment, having the structure as described above, has the structure of the hinge 240, which is more simplified than the hinge 140 of the display device 100 according to the exemplary embodiment described above, it may be easily manufactured, and may be more easily repaired if a repair is required.

In the coupling structure between the hinge 240 and the first body member 110, and the coupling structure between the hinge 240 and the second body member 120, in the display device 200 according to the present exemplary embodiment of the present invention, rotation shafts S may be formed in the first body member 110 and the second body member 120, by way of example. In addition, housing grooves H may be formed in the hinge 240, such that rotation shafts S may be housed in the housing grooves H.

In the display device 200 according to the present exemplary embodiment having the structure as described above, the receiving groove 243 may include a pair of second receiving grooves 243*a* and a pair of third receiving grooves 243*b*. Therefore, the display device 200 may more firmly implement a locked state by having the locking members 150 housed in the third receiving grooves 243*b* when the first body member 110 and the second body member 120 are folded to be adjacent each other, as compared to the display device 100 including only the pair of first receiving grooves 143*a* (see FIG. 3).

FIGS. 10A to 10D are drawings schematically showing locked or unlocked states according to movement of the locking members 150 in a state in which the display device 200 according to the present exemplary embodiment is unfolded or folded.

Figure 10A:
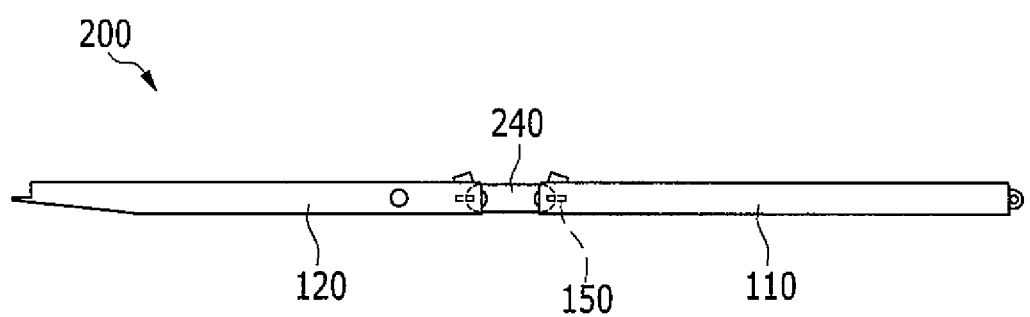
FIG. 10A is a drawing schematically showing a state in which locking members protrude and are received in a pair of first receiving grooves in a state in which the display device, according to the exemplary embodiment shown in FIG. 6, is unfolded.

FIG. 10A is a drawing schematically showing a state in which locking members protrude and are received in a pair of second receiving grooves in a state in which the display device, according to the present exemplary embodiment shown in FIG. 6, is unfolded.

Once the locking members 150 protrude in the state in which the first body member 110 and the second body member 120 are unfolded, as shown in FIG. 10A, the first body member 110 and the second body member 120 are coupled to the hinge 240, and are rotationally fixed with respect to each other.

Figure 10B:
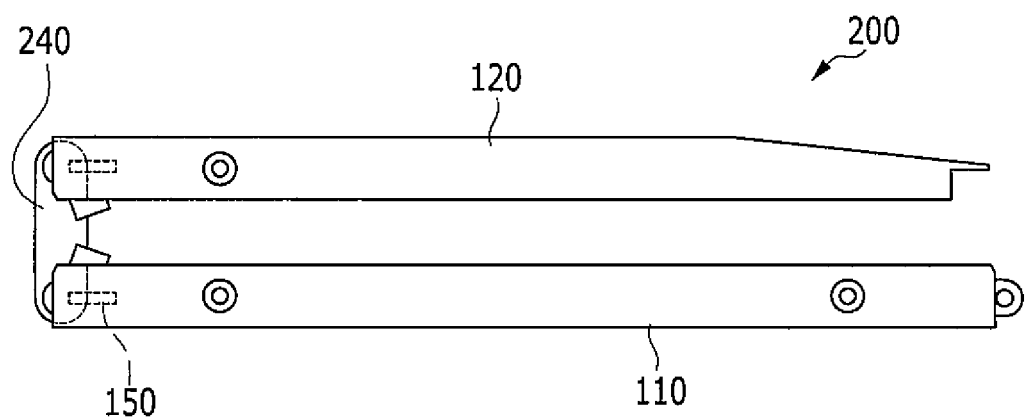
FIG. 10B is a drawing schematically showing a state in which the locking members protrude and are received in a pair of second receiving grooves in a state in which the display device, according to the exemplary embodiment shown in FIG. 7, is folded.

FIG. 10B is a drawing schematically showing a state in which the locking members protrude and are received in a pair of third receiving grooves in a state in which the display device, according to the present exemplary embodiment shown in FIG. 7, is folded.

Once the locking members 150 protrude in the state in which the display device 200 is folded, as shown in FIG. 10B, the first body member 110 and the second body member 120 are coupled to the hinge 240, and are rotationally fixed with respect to each other.

Figure 10C:
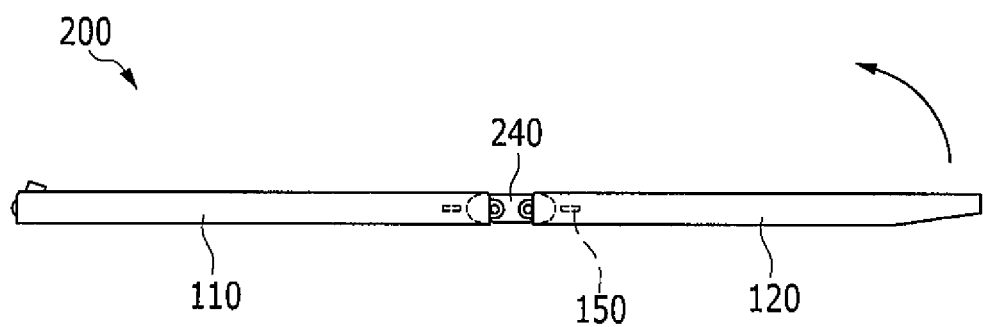
FIG. 10C is a drawing schematically showing a state in which the locking members are received in the first body member and the second body member, respectively, in the state in which the display device, according to the exemplary embodiment shown in FIG. 6, is unfolded.
Figure 10D:
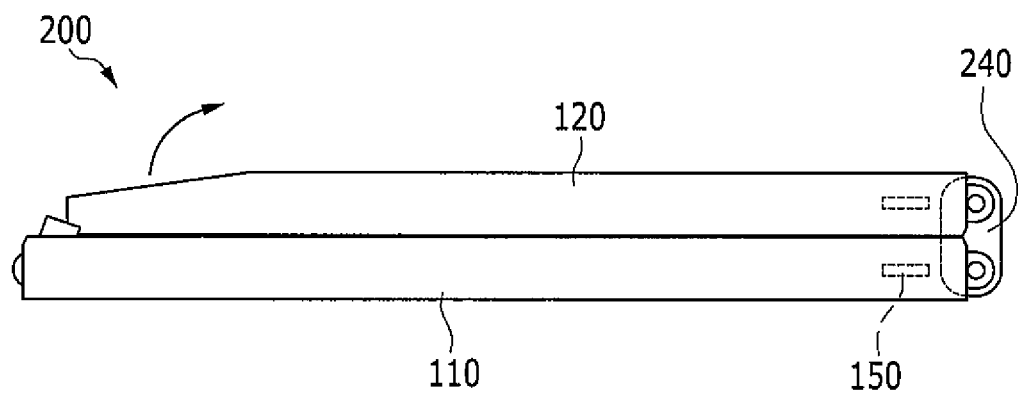
FIG. 10D is a drawing schematically showing a state in which the locking members are received in the first body member and the second body member, respectively, in the state in which the display device, according to the exemplary embodiment shown in FIG. 7, is folded.

FIG. 10C is a drawing schematically showing a state in which the locking members are received in the first body member and the second body member, respectively, in the state in which the display device, according to the present exemplary embodiment shown in FIG. 6, is unfolded, and FIG. 10D is a drawing schematically showing a state in which the locking members are received in the first body member and the second body member, respectively, in the state in which the display device, according to the present exemplary embodiment shown in FIG. 7, is folded.

As shown in FIGS. 10C and 10D, because the locking members 150 are in a state in which they are received in the first body member 110 and the second body member 120, respectively, the first body member 110 and the second body member 120 may be rotated with respect to each other.

Figure 11:
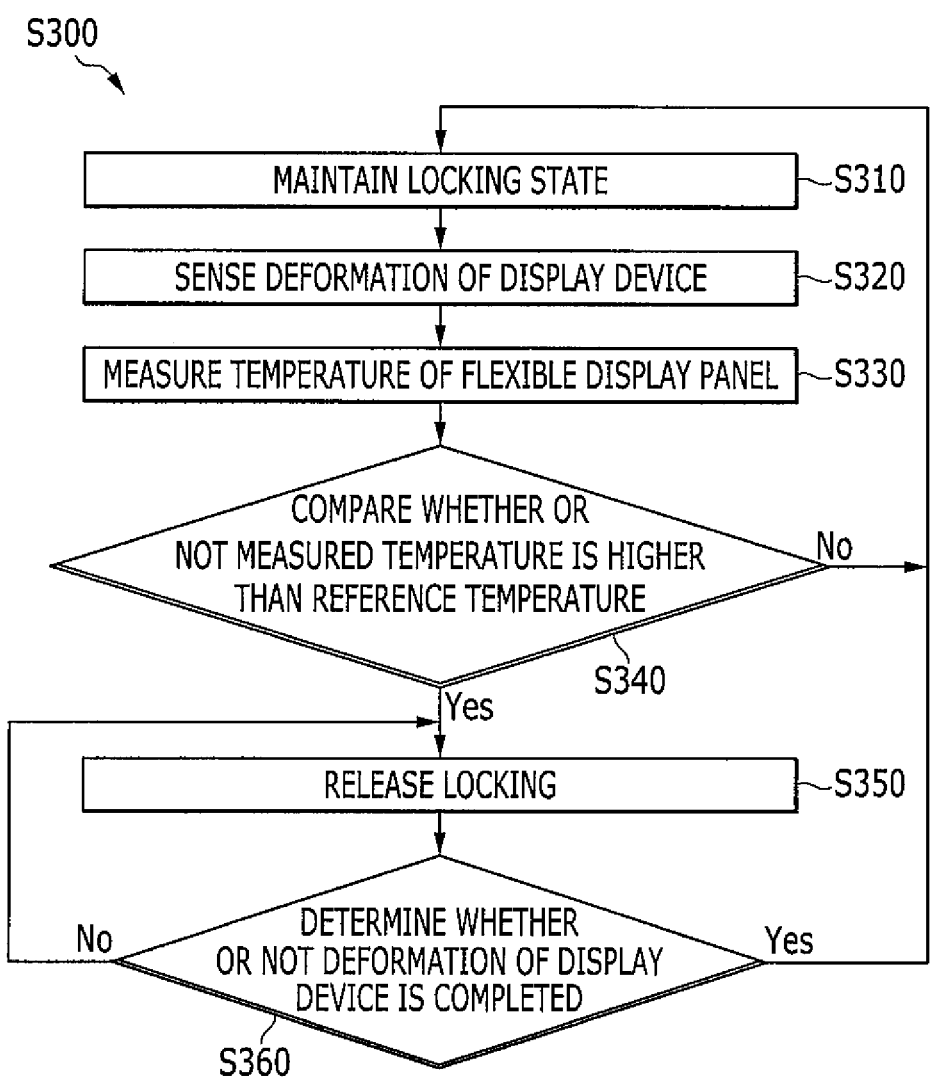
FIG. 11 is a flowchart sequentially showing a display device deformation controlling method according to an exemplary embodiment of the present invention.

FIG. 11 is a flowchart sequentially showing a display device deformation controlling method according to an exemplary embodiment of the present invention.

Referring to FIG. 11, a display device deformation controlling method for controlling a deformation of the display device, according to the exemplary embodiment having the structure described above, will be described in detail.

A display device deformation controlling method (S300) according to an exemplary embodiment includes an operation (S320) of sensing the deformation of the display device, an operation (S330) of measuring temperature of the flexible display panel, an operation (S340) of comparing the measured temperature with a reference temperature, an operation (S350) of releasing a locked state (e.g., initiating or maintaining a released state) when the measured temperature is higher than the reference temperature, and an operation (S310) of maintaining the locked state (e.g., initiating or maintaining the locked state) when the measured temperature is not higher than the reference temperature.

The locked state may be a state in which the second body member is not rotatable with respect to the first body member, and a state in which the lock is released (e.g., a released state) may be a state in which the second body member is rotatable with respect to the first body member.

Hereinafter, the respective operations of the display device deformation controlling method (S300) according to an exemplary embodiment will be described in detail.

In the operation (S320) of sensing the deformation of the display device, it may be determined whether or not a user pushes a manipulation button of the display device. Alternately, in the operation (S320) of sensing the deformation of the display device, it is also possible to sense whether or not the user applies force to the first body member or the second body member.

In the operation (S330) of measuring the temperature of the flexible display panel, the temperature measuring unit measures the temperature of the flexible display panel. Temperature data measured by the temperature measuring unit may be stored in a storage unit.

It is also possible to sequentially perform the operation (S320) of sensing the deformation of the display device and the operation (S330) of measuring the temperature of the flexible display panel, and it is also possible to perform the operation (S330) of measuring the temperature of the flexible display panel in real time. That is, in a situation in which the operation (S330) of measuring the temperature of the flexible display panel is regularly performed, the operation (S320) of sensing the deformation of the display device may be performed.

In the operation (S340) of comparing the measured temperature with the reference temperature, it is determined whether or not the measured temperature of the flexible display pane is higher than the reference temperature by comparing the measured temperature of the flexible display pane with the reference temperature. Here, because a description of the reference temperature is provided above, a repeated description thereof will be omitted.

In addition, when the measured temperature is higher than the reference temperature, the operation (S350) of releasing the locked state (e.g., initiating or maintaining the released state) is performed. Accordingly, a state (e.g., the released state) may be implemented in which the first body member and the second body member are rotatable with respect to each other.

Alternately, when the measured temperature is not higher than the reference temperature, the operation (S310) of maintaining the locked state is performed. Accordingly, a state is implemented in which the first body member and the second body member are not rotatable with respect to each other, thereby making it possible to prevent the deformation of the flexible display panel (e.g., folding or unfolding of the flexible display panel).

In the display device deformation controlling method (S300) according to an exemplary embodiment of the present invention, when the measured temperature is higher than the reference temperature, an operation (S360) of determining whether or not the deformation of the display device is completed may be performed after the operation (S350) of releasing the locked state (e.g., initiating or maintaining the released state).

In the operation (S360) of determining whether or not the deformation of the display device is completed, once the deformation of the display device is completed, the locked state is maintained (e.g., reinitiated and maintained), and once the deformation of the display device is not completed, the released state in which the lock is released is maintained.

In addition, the locked state may be reinitiated and maintained when a reference time lapses after the deformation of the display device is completed. For example, the reference time may exceed 0 seconds and may be about 2 seconds or less. Accordingly, the user may easily use a deformed shape of the display device.

As described above, in the display device deformation controlling method (S300) according to the exemplary embodiment, the temperature of the flexible display panel is measured, and deformation is prevented such that the first body member and the second body member remain unfolded or folded when the measured temperature is lower than the reference temperature.

Accordingly, it is possible to reduce or prevent damage to the element included in the flexible display panel otherwise caused by a sudden change (e.g., sudden folding or unfolding) by allowing the elements (or components) to be unfolded or folded only at a temperature in which the elements (or components) included in the flexible display panel may be safely flexibly changed.

While embodiments of the invention have been described in connection with what is presently considered to be practical exemplary embodiments, the drawings and the detailed description that are described above are merely illustrative, are just used for the purpose of illustrating the present invention, and are not used for limiting the meaning or limiting the scope of the present invention, which is disclosed in the appended claims and their equivalents. Therefore, it will be appreciated to those skilled in the art that various suitable modifications can be made, and other equivalent embodiments are available. Accordingly, the actual technical protection scope of the embodiments of the present invention should be determined by the spirit of the appended claims and their equivalents.

| Description of symbols | |
| --- | --- |
| 100, 200: display device | 101: controller |
| 110: first body member | 120: second body member |
| 130: flexible display panel | 140, 240: hinge |
| 141: first hinge member | 142: second hinge member |
| 143, 243: receiving groove | 143a: first receiving groove |
| 243a: second receiving groove | 243b: third receiving groove |
| 150: locking member | |

What is claimed is:

1. A display device comprising:
a first body member;
a second body member;
a hinge coupling the first body member and the second body member;
a flexible display panel that is foldable, that is fixed to the first body member and to the second body member, and that is configured to display an image;
a controller comprising a temperature measuring unit configured to measure a temperature of the flexible display panel, the controller being configured to control the hinge to:
initiate or maintain a released state when the measured temperature is higher than a reference temperature; and
initiate or maintain a locked state when the measured temperature is not higher than the reference temperature.

2. The display device of claim 1, further comprising:
a first locking member at the first body member that is configured to protrude toward the hinge, and is configured to be received by the hinge;
a second locking member at the second body member that is configured to protrude toward the hinge, and is configured to be received by the hinge; and
a driving member configured to generate a driving force to cause the locking members to protrude,
wherein the hinge defines one or more receiving grooves for receiving the locking members.

3. The display device of claim 2,
wherein the one or more receiving grooves comprise a pair of first receiving grooves configured to receive the locking members when the second body member is unfolded from the first body member.

4. The display device of claim 2, wherein the hinge comprises:
a first hinge member between the first body member and the second body member, and
a second hinge member having one side that is rotatably coupled to the first hinge member, and another side that is rotatably coupled to either the first body member or the second body member.

5. The display device of claim 4,
wherein the locking members are configured to protrude to be adjacent the first hinge member in the state in which the first body member and the second body member are folded.

6. The display device of claim 2, wherein the one or more receiving grooves comprise:
a pair of second receiving grooves configured to receive the locking members in the state in which the first body member and the second body member are unfolded; and
a pair of third receiving grooves configured to receive the locking members in the state in which the first body member and the second body member are folded.

7. The display device of claim 6,
wherein the second receiving grooves are perpendicular to respective ones of the third receiving grooves.

8. The display device of claim 1,
wherein the second body member comprises two second body members coupled to respective sides of the first body member.

9. The display device of claim 1,
wherein the controller comprises the temperature measuring unit at the first body member and at the second body member.

10. The display device of claim 1,
wherein the controller further comprises a deformation sensor configured to sense whether the second body member is deformed with respect to the first body member, and
wherein the controller is configured to control the hinge to maintain a deformed state of the display device when a reference time lapses after the deformation sensor senses that deformation of the display device is completed.

11. The display device of claim 1,
wherein the second body member and the first body member are configured to be at a same plane when the second body member is maximally rotated away from the first body member.

12. The display device of claim 1,
wherein the second body member is configured to form an angle with the first body member when the second body member is maximally rotated away from the first body member.

13. A method for controlling deformation of a display device comprising a flexible display panel, the method comprising:
sensing deformation of the display device;
measuring a temperature of the flexible display panel;
comparing the measured temperature with a reference temperature;
initiating or maintaining a released state when the measured temperature is higher than the reference temperature; and
initiating or maintaining a locked state when the measured temperature is not higher than the reference temperature.

14. The method of claim 13, further comprising:
determining whether the deformation of the display device is completed after the initiating or maintaining the released state.

15. The method of claim 14, further comprising:
initiating or maintaining the locked state when the deformation of the display device is completed; and
initiating or maintaining the released state when the deformation of the display device is not completed.

16. The method of claim 13, further comprising:
initiating or maintaining the locked state once a reference time lapses after the deformation of the display device is completed.

17. The method of claim 16,
wherein the reference time is about 2 seconds or less.

18. The method of claim 13, wherein the display device comprises:
a first body member; and
a second body member rotatably coupled to the first body member,
wherein the locked state is a state in which the second body member is not rotatable with respect to the first body member, and
wherein the released state is a state in which the second body member is rotatable with respect to the first body member.

* * * * *